Aug. 25, 1970 — C. L. DARNER — 3,525,977

APPARATUS AND METHOD FOR CONTROLLING CAVITATION

Filed Dec. 21, 1967

Charles L. Darner
INVENTOR.

BY John F. Miller
Agent

John M. —
Attorney

United States Patent Office 3,525,977
Patented Aug. 25, 1970

3,525,977
APPARATUS AND METHOD FOR CONTROLLING CAVITATION
Charles L. Darner, Orlando, Fla., assignor to the United States of America as represented by the Secretary of the Navy
Filed Dec. 21, 1967, Ser. No. 693,694
Int. Cl. H04p 1/46
U.S. Cl. 340—8         4 Claims

ABSTRACT OF THE DISCLOSURE

The onset of cavitation in the water surrounding a sonar transducer is retarded by adding steel filled permeable bags to de-oxygenate the water.

BACKGROUND OF THE INVENTION

The invention is in the field of sonar apparatus. A long continuing problem in the operation of sonar transducers used to transmit sonar signals is the cavitation which occurs in the surrounding water when a transducer is operated at high power levels. This greatly reduces the efficiency and thereby the range and effectiveness of the sonar apparatus. Additionally, the effects of cavitation are very destructive of equipment. In the past, various expedients have been used to reduce or retard the onset of cavitation. For example, one expedient has been pressurization of the water in sonar domes attached to surface vessels. But this has required complex, cumbersome, and expensive equipment. Various other expedients have been tried; however, prior to applicant's invention, all have proven impracticable for various reasons.

SUMMARY OF THE INVENTION

Closed bags of permeable material containing finely divided steel are immersed in the water in a sonar dome or tank. The steel rusts, thereby removing oxygen from the water which should theoretically permit a doubling of the power input to a sonar transducer in the dome without causing cavitation in the water. However, for reasons not known, the transducer power may be increased ten times before cavitation begins.

DESCRIPTION OF THE PREFERRED EMBODIMENT

In sonar apparatus, an array of transducers for transmitting underwater sound is housed in a water filled enclosure such as a streamlined dome fixed to the hull of a vessel below the water line. In laboratory and testing installations a tank is often used in lieu of a dome. Sound energy developed by the transducers is transmitted through the water in the dome and through the wall of the dome to the surrounding sea water. Heretofore, the effectiveness of sonar transducers has been limited by the tendency of the water in the dome to cavitate at high acoustic power ranges. Cavitation is characterized by the production of voids or cavities in the water. It occurs in a sonar dome when the instantaneous value of the acoustic pressure exceeds the static pressure, the resultant pressure then becoming negative for a portion of each cycle. This destroys the integrity of the water as an acoustic medium to the extent that it cannot couple the energy output of the transducers to the dome and the surrounding sea with reasonable efficiency. One theory holds that the inception of cavitation is caused by undissolved gas in the water, perhaps in the form of microbubbles trapped in submicroscopic cracks in solid matter suspended in the water. Some of these microbubbles may coalesce until they reach resonant size at which time they will act as cavitation forming elements or nuclei at very low transducer power levels. The cavities formed in the water during cavitation are initially evacuated. Since the water contains more or less dissolved air, the solubility of which depends on pressure, some air escapes into the lower pressure area within the cavities together with some water vapor. When the total pressure in the neighborhood of the cavity resumes a positive value, the cavity collapses to the point where the pressure of the air in the cavity equals the hydrostatic pressure. The partial collapse results in an air bubble and is accompanied by the release of acoustic energy. Thus cavitation not only limits the output of a sonar transmitter, but produces extraneous noise which seriously interferes with the sonar signals.

Figure 1:
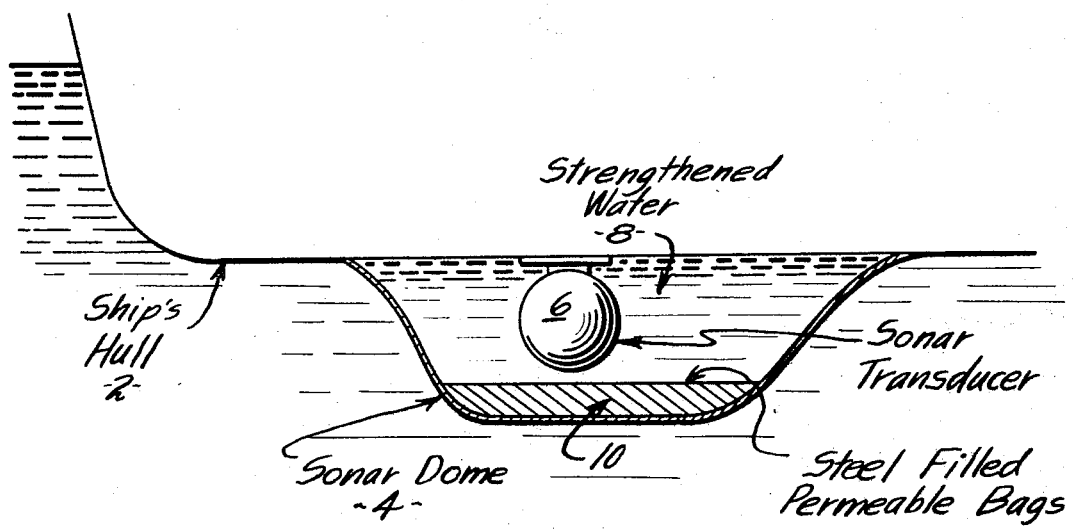
FIG. 1 shows a dome housing a sonar transducer.
Figure 2:
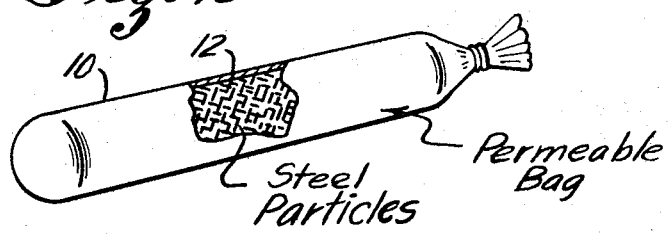
FIG. 2 shows a typical steel filled permeable bag.

The invention is designed to eliminate or retard the onset of cavitation in for example, domes, tanks, etc., by removing oxygen from the water. Since oxygen comprises approximately one-third of the gas in water, its removal should eliminate approximately one-third of the cavitation forming nuclei. The remaining gas which is principally nitrogen, will from the standpoint of cavitation be equivalent to water saturated with gas at a pressure of 50 cm. Hg. Referring now to FIG. 1, there is shown a part of the hull of a vessel 2, to which is attached a dome 4. An array of sonar transducers is shown as element 6 within dome 4 which is filled with water 8. The water 8 is different from the sea water outside the dome in that it is "stronger" from an acoustic standpoint. That is, it has been treated to withstand a much higher level of acoustic output from transducer array 6 without incurring cavitation, than will ordinary water. The treatment comprises placing a plurality of steel filled permeable bags 10 inside dome 4. An example of a permeable bag 10 is shown in FIG. 2. Bag 10 is filled with small steel particles 12. Bag 10 may be of any suitable material that is permeable to gas and water. Many of the polymers work well and natural rubber such as found in toy balloons is very satisfactory. The steel should be finely divided to promote oxidation which removes oxygen from the water. Steel wool has been used but has a tendency to puncture the bags. Small punch-outs from the steel straps used in binding shipping cartons have been found to be satisfactory. A sufficient quantity must be provided to combine with the oxygen present in the dome. This varies with temperature from 0.25 lb./ft.$^3$ at 20° C. to 1 lb./ft.$^3$ at 0° C. The shape of bags 10 is chosen to facilitate entry into or removal through small ingress ports in the hull of the vessel or the dome which are ordinarily plugged. This permits servicing of the dome with the bags without dry docking the vessel. The bags may be packed with steel and closed dry, or some water may be added before closing; however, less time is required to de-oxygenate the water when the steel is wet packed. The steel could be directly immersed in the water but the bags keep loose rust particles from the water in the dome and facilitate handling.

The results obtained by the invention are completely unexpected. Based on the theory of numerous publications of the prior art, it was anticipated that a de-oxygenation of the water in a dome would permit a doubling or perhaps a four-fold increase of the power input to a sonar transducer before cavitation would begin. The use of steel to remove the oxygen was selected as an inexpensive and convenient expedient. However, when the steel filled bags were placed in an experimental dome and in a laboratory tank, after a short period of time elapsed it was found that the power input to the sonar transducer could be increased tenfold without encountering cavitation. The length of time necessary for the steel to react with the water to obtain maximum benefits may vary with the water used, temperature, and other factors. The reasons for the dramatically improved results are presently unknown. The characteristics of water (both fresh and sea) are not well understood at present. However, the invention is exceedingly effective, vastly increasing the efficiency of sonar apparatus without resorting to complex and expensive pressurizing apparatus and the excessively heavy domes, etc., necessary with pressurized systems. It is particularly useful in laboratory tanks and other installations not suitable for pressurization.

Many modifications and variations of the invention will become obvious in the light of the above disclosure. The invention is therefore not confined to the disclosed embodiment but is limited only by the following claims.

The invention described herein may be manufactured and used by or for the Government of the United States of America for governmental purposes without the payment of any royalties thereon or therefor.

What is claimed is:

1. In a sonar apparatus having a sonar transducer, the improvement comprising:
    a housing surrounding said sonar transducer, a quantity of water in said housing, said sonar transducer being immersed in said water, a quantity of steel located in said housing, said steel being immersed in said water so that rust is caused to form on said steel, permeable means interposed between said steel and said water to confine said steel and to prevent the entry of rust into said water, whereby an increased resistance to the cavitation caused by operation of said sonar transducer is developed in said water.

2. In apparatus for retarding cavitation in water, the improvement comprising:
    a measured quantity of said water, a container for containing said measured quantity of water, and a measured quantity of steel particles sufficient to combine with most of the oxygen in said measured quantity of water positioned in said container, said steel particles being immersed in said measured quantity of water, permeable means for containing said steel particles, said permeable means being interposed between said steel particles and said measured quantity of water, to thereby confine any rust developed on said steel particles and to prevent the entry of rust into said measured quantity of water.

3. The method of retarding cavitation in water comprising the steps of:
    confining a quantity of said water,
    observing the temperature of said quantity of water,
    immersing a quantity of steel particles sufficient to combine with most of the oxygen in said quantity of water at said temperature, and aging the resulting mixture a length of time sufficient for most of the oxygen in said quantity of water to combine with said quantity of steel particles and said quantity of water to develop a resistance to cavitation.

4. The method of claim 3 and including the step of shielding said quantity of water from any rust particles developed on said steel particles.

References Cited

UNITED STATES PATENTS 2,913,602 11/1959 Joy _____ 310—8.3
3,278,771 10/1966 Fry.

RODNEY D. BENNETT, JR., Primary Examiner

B. L. RIBANDO, Assistant Examiner